United States Patent [19]
Nakada

[11] Patent Number: 5,348,254
[45] Date of Patent: Sep. 20, 1994

[54] LONG PERIOD FLOATING AIRSHIP

[76] Inventor: Kazuo Nakada, 318, Hazawa-cho, Kanagawa-ku, Yokohama-shi, Kanagawa-ken, Japan

[21] Appl. No.: 84,796

[22] Filed: Jun. 29, 1993

[30] Foreign Application Priority Data

Jul. 1, 1992 [JP] Japan ................................. 4-211943

[51] Int. Cl.⁵ .............................................. B64B 1/58
[52] U.S. Cl. ....................................... 244/97; 244/61; 244/30
[58] Field of Search ....................... 244/30, 96, 97, 98, 244/61, 24

[56] References Cited

U.S. PATENT DOCUMENTS

| | | | |
|---|---|---|---|
| 1,372,925 | 3/1921 | Andersson | 244/30 |
| 1,802,586 | 4/1931 | Stokes | 244/61 |
| 3,897,032 | 7/1975 | Papst | 244/30 |
| 4,032,085 | 6/1977 | Papst | 244/30 |
| 4,364,532 | 12/1982 | Stark | 244/30 |

*Primary Examiner*—Michael S. Huppert
*Assistant Examiner*—Anne E. Bidwell
*Attorney, Agent, or Firm*—Elliot M. Olstein; Raymond J. Lillie

[57] ABSTRACT

An airship of semirigid type including hydrogen which floats for a long period of time without supplying energy, and is for example in use for a relay station or a wide range observatory station. The airship is powered by a solar cell battery in the daytime and by a hydrogen engine in the nighttime.

3 Claims, 1 Drawing Sheet

LONG PERIOD FLOATING AIRSHIP

BACKGROUND OF THE INVENTION

1. Field of the Invention

The present invention relates to an airship which floats for a long period of time without supply of energy.

2. Brief Description of the Prior Art

A fixed wing airplane, when used as a relay station or a wide range observatory platform, must be continuously flying, and is therefore possibly encounters a danger of fall down due to a trouble of an instrument during flying. On the other hand, an airship can float itself in the air and is prevented from such a danger. A power source therefor may be supplied from the ground through a microwave power transmission, or utilization of solar energy. The former requires a power transmitting base on the ground, and the flying range in which the flying body travels is limited so as to properly receive the electric power. Also, it is difficult to prevent electric wave trouble. In order to utilize the solar power in the daytime, it is only required to install a solar cell, but needs to install an electric battery for storing energy for the nighttime. The invention enables a long time travelling of an airship without carrying a heavy battery.

Airships include three types of rigid, nonrigid and semirigid. The rigid type has heavy weight, while the nonrigid has a structural problem due to its form in which the gondola is hung by a catenary curtain. The conventional semirigid airship, on the outside of which a keel is disposed, suffers from a large loss of air friction.

SUMMARY OF THE INVENTION

An object of the present invention is to provide an airship which floats in the stratosphere for a long period of time without supplied with any energy for stabilizing a radio relay station.

DETAILED DESCRIPTION OF THE PREFERRED EMBODIMENT

Figure 1:
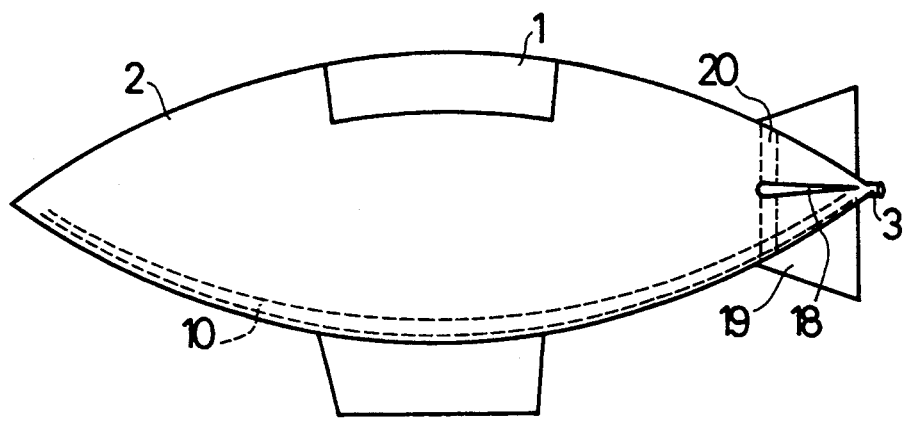
FIG. 1 is a side elevational view of an airship according to the invention.
Figure 2:
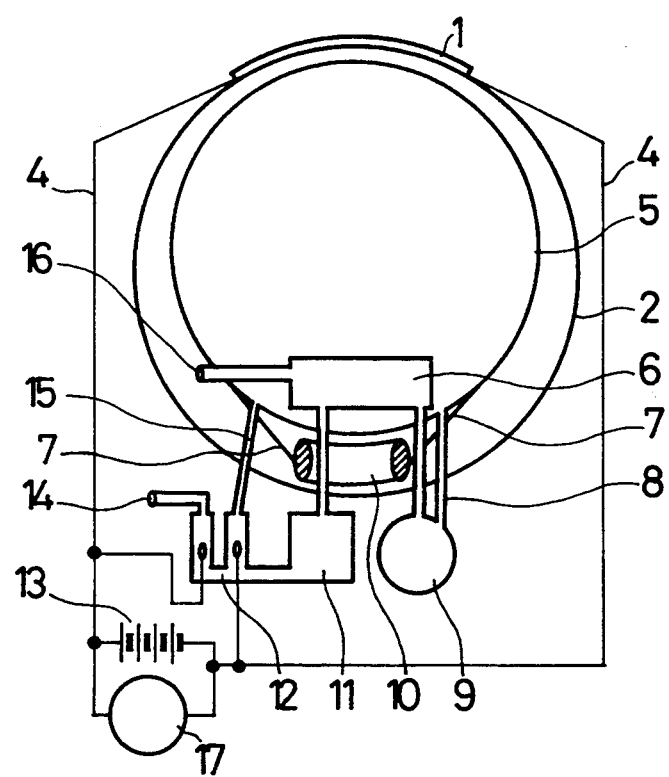
FIG. 2 is a sectional view of the airship together with a schematic illustration of a control arrangement.

In the present invention, a keel 10 is disposed within an envelope and a buoyant cell 5 is supported by the keel 10 through nets or cords 7, which permits an adequate distribution of the weight of the airship.

The buoyant cell 5 may be preferably divided into three compartments, and hydrogen enclosed therein may be transferred to each other to improve trim of the ship.

The use of hydrogen as lifting gas allows to utilize the hydrogen in the cell 5 as the fuel for a hydrogen engine 9 through a fuel pipe 8 in the nighttime. The exhaust gas is cooled in a heat exchanger 6. The decrease of buoyant force due to the cooled airship is compensated by recovering exhaust heat of the engine. The temperature in the height of 20 km is about −60° C. and the water contained in the exhaust gas can be almost completely recovered. The separated water is stored in a water tank 11, the exhaust gas being freed into the envelope 2 through an exhaust pipe 16. When the internal pressure of envelope 2 exceeds the external pressure by 2.5 cm of water head, the air is discharged via an outlet 3 equipped with a pressure adjustment valve. In such a manner, hydrogen enclosed within the cell 5 is completely isolated from the external air of the envelope 2 to prevent explosion. In the event that the envelope 2 is damaged and the internal pressure decreases to the external pressure, if the stored hydrogen quantity is less than the entire volume of the cell 5 by approximately 1%, the cell 5 will be prevented from explosion and accordingly the buoyancy is maintained. In a conventional nonrigid airship, the airship form cannot be maintained when the envelope is damaged to unable navigation. In contrast, in the invention, the rudder 19 and elevator 18 are secured to the frame 20 and navigation is maintained even in the above event. In case that the frame 20 is also damaged and elevator 18 turns inoperable, ascent and descent is still possible by displacing hydrogen in the cell 5 to the nose or tail compartment. Since the lower rudder 19 is secured to the keel 10, the flying direction is properly controlled as desired, even though it becomes impossible to maintain the airship form.

Also, another construction may be selected, in which the frame can be omitted, and the rudder and elevator are directly secured to the keel having a broadened width.

The electric power generated in a solar cell 1 is transmitted through a power transmission line 4 to a storage battery 13, a water electrolyzer 12 and propulsion motor 17. A water tank 11 and electrolyzer 12 are preferably hung so as not to be affected by inclination of the ship so that the water surface is always properly leveled. Hydrogen produced by electrolyzer 12 is transferred to cell 5 through a hydrogen pipe 15. Oxygen as a by-product is discharged via an oxygen outlet 14.

As described above, the airship of the invention, which is powered by the solar cell in the daytime and by the hydrogen engine in the night, can fly for a long time without supplement of energy.

What is claimed is:

1. A semirigid airship including hydrogen, comprising:

a hydrogen engine;

an envelope;

an outlet means attached to said envelope;

a keel enclosed in said envelope;

a frame disposed on an end of said keel;

at least two elevators fixed to the external surface of said envelop;

a rudder fixed to the external surface of said envelope, whereby the fixed portions of said at least two elevators and said rudder are secured to said frame; and a cell supported by said keel through a cord for providing a buoyant force for said airship, characterized in that the engine exhaust gas is disposed between said envelope and said cell, and said exhaust gas is dischargeable through said outlet.

2. The airship of claim 1, and further comprising:

a solar battery;

a heat exchanger; and a storage tank, whereby said airship is driven by the power generated by said hydrogen engine in the nighttime and the exhaust gas is separated to gas and water in said heat exchanger; the gas is filled into said envelope, and the water is stored in said tank; and the airship is driven by the electric power supplied by said solar battery, and the remaining power is employed to electrolyze the water to produce hydrogen, said hydrogen being stored in said buoyant cell.

3. A semirigid airship including hydrogen, comprising:
   a hydrogen engine;
   an envelope;
   an outlet means attached to said envelope;
   a keel enclosed in said envelope;
   a frame disposed on an end of said keel;
   at least two elevators fixed to the external surface of said envelope;
   a rudder fixed to the external surface of said envelope, whereby the fixed portions of said at least two elevators and said rudder are secured to said frame;
   a cell supported by said keel through a cord for providing a buoyant force for said airship, characterized in that the engine exhaust gas is disposed between said envelope and said cell, and said exhaust gas is dischargeable through said outlet;
   a solar battery;
   a heat exchanger; and
   a storage tank,
   whereby said airship is driven by the power generated by said hydrogen engine in the nighttime, and the exhaust gas is separated to gas and water in said heat exchanger, the gas is filled in said envelope and the water is stored in said storage tank, and the airship is driven by the electric power supplied by the solar battery and remaining power is employed to electrolyze water to produce hydrogen, whereby said hydrogen is stored in said cell.

* * * * *